US010289534B1

(12) United States Patent
Shama et al.

(10) Patent No.: US 10,289,534 B1
(45) Date of Patent: May 14, 2019

(54) SYSTEM, METHOD, AND COMPUTER PROGRAM FOR EFFICIENTLY AUTOMATING BUSINESS FLOW TESTING

(71) Applicant: Amdocs Development Limited, Limassol (CY)

(72) Inventors: Gilli Shama, Ra'anana (IL); Yaron Weiss, Champaign, IL (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 51 days.

(21) Appl. No.: 15/336,615

(22) Filed: Oct. 27, 2016

Related U.S. Application Data

(60) Provisional application No. 62/248,228, filed on Oct. 29, 2015.

(51) Int. Cl.
  *G06F 9/44* (2018.01)
  *G06F 11/36* (2006.01)
(52) U.S. Cl.
  CPC ...... *G06F 11/3688* (2013.01); *G06F 11/3684* (2013.01)
(58) Field of Classification Search
  CPC .................................. G06F 11/3664–11/3696
  USPC .................................................. 717/124–133
  See application file for complete search history.

(56) References Cited

U.S. PATENT DOCUMENTS

| 5,021,997 | A | 6/1991 | Archie et al. | |
|---|---|---|---|---|
| 6,405,364 | B1* | 6/2002 | Bowman-Amuah | G06F 8/20 717/101 |
| 6,993,748 | B2 | 1/2006 | Schaefer | |
| 7,272,822 | B1* | 9/2007 | Riggins | G06F 9/451 717/124 |
| 7,490,319 | B2* | 2/2009 | Blackwell | G06F 11/3664 717/124 |
| 7,581,212 | B2 | 8/2009 | West et al. | |

(Continued)

OTHER PUBLICATIONS

Libo Zhou, Lei Xu, Baowen Xu and Hongji Yang: "Generating Test Cases for Composite Web Services by Parsing XML Documents and Solving Constraints"—2015 IEEE 39th Annual International Computers, Software & Applications Conference;Jul. 1-5, 2015 IEEE.*

(Continued)

*Primary Examiner* — Francisco J Aponte
(74) *Attorney, Agent, or Firm* — Zilka-Kotab, P.C.

(57) ABSTRACT

A system, method, and computer program product are provided for efficiently automating software testing of business flows. In use, a business flow executed by a user is recorded by a testing system. The business flow is executed by the testing system utilizing a plurality of user selected parameters. Additionally, the recorded business flow is automatically parsed by the testing system into a plurality of activities associated with the business flow. Further, one or more existing automated activities in a test automation repository that correlate with one or more of the plurality of activities associated with the business flow are identified by the testing system (e.g. using a smart match algorithm). Moreover, an automated test for the business flow is generated by the testing system utilizing the one or more existing automated activities in the test automation repository. The automated test for the business flow is capable of utilizing a plurality of automatically selected parameters for testing the business flow.

13 Claims, 8 Drawing Sheets

(56) References Cited

U.S. PATENT DOCUMENTS

| | | | | |
|---|---|---|---|---|
| 7,627,843 B2* | 12/2009 | Dozorets | ............ | G06F 17/5022 702/118 |
| 7,793,154 B2* | 9/2010 | Chagoly | ............ | G06F 11/3688 703/22 |
| 7,856,619 B2* | 12/2010 | He | ............ | G06F 11/3684 715/763 |
| 8,312,322 B2 | 11/2012 | Gururaj | | |
| 8,347,147 B2* | 1/2013 | Adiyapatham | ..... | G06F 11/3672 714/38.1 |
| 8,443,336 B2* | 5/2013 | Vieira | ............ | G06F 11/3684 717/104 |
| 8,522,212 B1* | 8/2013 | Bhatnagar | ............ | G06F 11/3684 717/104 |
| 8,578,336 B1* | 11/2013 | Wiradarma | ......... | G06F 11/3684 717/125 |
| 8,589,886 B2* | 11/2013 | Lavie | ............ | G06F 11/263 702/108 |
| 8,694,969 B2* | 4/2014 | Bernardini | ............ | G06F 11/366 717/101 |
| 8,826,084 B1* | 9/2014 | Gauf | ............ | G06F 11/3688 714/32 |
| 9,098,633 B2* | 8/2015 | Kianovski | ............ | G06F 11/3684 |
| 9,170,921 B2* | 10/2015 | N'Gum | ............ | G06F 11/3664 |
| 9,311,223 B2* | 4/2016 | Bartley | ............ | G06F 11/3676 |
| 9,367,434 B2* | 6/2016 | Taneja | ............ | G06F 11/3684 |
| 9,559,928 B1* | 1/2017 | Porter | ............ | G06F 11/3612 |
| 9,658,944 B2* | 5/2017 | Ganda | ............ | G06F 11/3664 |
| 9,767,009 B2* | 9/2017 | Cobb, Jr. | ............ | G06F 11/3688 |
| 9,785,541 B1* | 10/2017 | Elgarat | ............ | G06F 11/368 |
| 2003/0046029 A1* | 3/2003 | Wiener | ............ | G06F 11/3672 702/186 |
| 2004/0143819 A1* | 7/2004 | Cheng | ............ | G06F 11/3688 717/125 |
| 2005/0257198 A1* | 11/2005 | Stienhans | ............ | G06F 11/3672 717/124 |
| 2005/0268285 A1 | 12/2005 | Bagley et al. | | |
| 2007/0061780 A1* | 3/2007 | Pokluda | ............ | G06F 11/3672 717/124 |
| 2009/0089688 A1* | 4/2009 | Zhao | ............ | G06F 11/3684 715/762 |
| 2009/0210748 A1* | 8/2009 | Hohmann | ............ | G06F 11/3696 714/32 |
| 2009/0276458 A1* | 11/2009 | Moulckers | ............ | G06F 11/368 |
| 2010/0114939 A1* | 5/2010 | Schulman | ............ | G06F 11/3672 707/769 |
| 2010/0325492 A1* | 12/2010 | Isaacs | ............ | G06F 11/3664 714/38.1 |
| 2011/0265020 A1* | 10/2011 | Fields | ............ | G06Q 10/06 715/760 |
| 2012/0260129 A1* | 10/2012 | Wilson | ............ | G06F 11/3688 714/32 |
| 2014/0007056 A1 | 1/2014 | Leizerovich et al. | | |
| 2014/0165043 A1* | 6/2014 | Pasala | ............ | G06F 11/3684 717/124 |
| 2015/0100829 A1* | 4/2015 | Nanjundappa | ...... | G06F 11/3688 714/38.1 |
| 2015/0100830 A1* | 4/2015 | Nanjundappa | ...... | G06F 11/3688 714/38.1 |
| 2015/0100831 A1* | 4/2015 | Nanjundappa | ...... | G06F 11/3684 714/38.1 |
| 2015/0100832 A1* | 4/2015 | Nanjundappa | ...... | G06F 11/3688 714/38.14 |
| 2015/0178182 A1* | 6/2015 | Mallya | ............ | G06F 11/3672 717/124 |
| 2016/0147642 A1* | 5/2016 | Haeuptle | ............ | G06F 11/3664 717/124 |
| 2016/0283358 A1* | 9/2016 | Mallya | ............ | G06F 11/3684 |

OTHER PUBLICATIONS

Wikipedia, "List of GUI testing tools," Wikipedia, Dec. 28, 2014, pp. 1-3, as retrieved by the Internet Archive Wayback Machine, https://web.archive.org/web/20141228005335/http:/en.wikipedia.org/wiki/List_of_GUI_testing_tools.

* cited by examiner

SYSTEM, METHOD, AND COMPUTER PROGRAM FOR EFFICIENTLY AUTOMATING BUSINESS FLOW TESTING

CLAIM OF PRIORITY

This application claims the benefit of U.S. Provisional Application No. 62/248,228, filed Oct. 29, 2015, the entire contents of which are incorporated herein by reference.

FIELD OF THE INVENTION

The present invention relates to software testing, and more particularly to more efficiently automating software testing of business flows.

BACKGROUND

Companies strive to promote their system's user interface (UI) testing through automation so that a script written once can be used multiple times. Each testing project requires automation for re-runs of the same flows, such as regression testing and agile testing. Automation is even further utilized in projects where the business flow is broken into activities, and automated activities are re-used for different tested business flows. For example, the automation script for a log-in to a tested system can be reused for all automated business flows with that tested system.

According to the characteristics of the project, the testing automation team decides which business flows to automate and determines where to reuse automated activities from one flow to another. The coverage and resulting quality of testing projects can increase with the more business flows that are automated. However, building automation scripts requires the effort of automation developers and experts and depends on the relative stability of the testing environment. The dependency of the testing projects on automation is growing, especially with the increase of agile projects. Each company invests in test automation on its IT projects.

There is thus a need for addressing these and/or other issues associated with the prior art.

SUMMARY

A system, method, and computer program product are provided for efficiently automating software testing of business flows. In use, a business flow executed by a user is recorded by a testing system. The business flow is executed by the testing system utilizing a plurality of user selected parameters. Additionally, the recorded business flow is automatically parsed by the testing system into a plurality of activities associated with the business flow. Further, one or more existing automated activities in a test automation repository that correlate with one or more of the plurality of activities associated with the business flow are identified by the testing system (e.g. using a smart match algorithm). Moreover, an automated test for the business flow is generated by the testing system utilizing the one or more existing automated activities in the test automation repository. The automated test for the business flow is capable of utilizing a plurality of automatically selected parameters for testing the business flow.

BRIEF DESCRIPTION OF THE DRAWINGS

FIGS. 2A-C show examples of scripts that are produced upon recording a business flow, in accordance with various embodiments.

DETAILED DESCRIPTION

Figure 1:
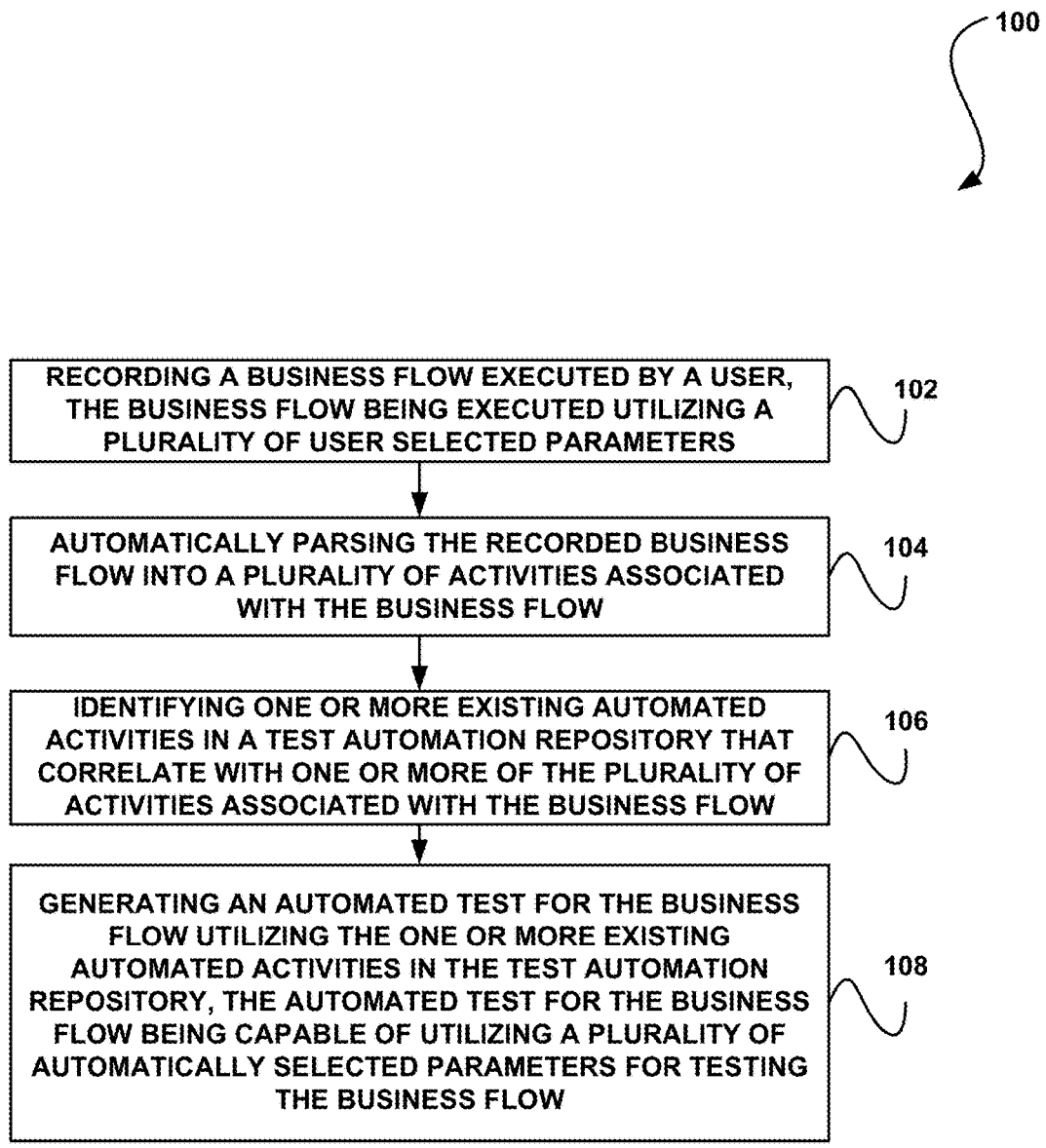
FIG. 1 illustrates a method for efficiently automating software testing of business flows, in accordance with one embodiment.

FIG. 1 illustrates a method 100 for efficiently automating software testing of business flows, in accordance with one embodiment.

As shown, a business flow executed by a user is recorded by a testing system. See operation 102. The business flow is executed utilizing a plurality of user selected parameters.

Additionally, the recorded business flow is automatically parsed by the testing system into a plurality of activities associated with the business flow. See operation 104. In one embodiment, the testing system may display results of the parsed recorded business flow utilizing a user interface (e.g. see FIG. 5, etc.). In this case, the results of the parsed recorded business flow may include indications associated with a quality of a match between the recorded business flow and the plurality of activities associated with the business flow. Activities refer to functions of one or more actions that makes a building block for activity/business flows.

Further, one or more existing automated activities in a test automation repository that correlate with one or more of the plurality of activities associated with the business flow are identified by the testing system. See operation 106. In one embodiment, the automated activities that correlate with the activities associated with the business flow may be identified utilizing a smart match algorithm.

Smart match refers to finding the matching elements in the repository, where each element on the screen (web particularly) can be identified by one or more object locators such as ID, Name, XPath, CSS, etc. However, the locators may all refer to the same element. Thus, it is possible that a user will record an element and it will be, for example, by ID=firstName. The user may change it to be by Name=FName, or by Xpath=/form/table[1]/ID=Fname, etc. Thus, the match has to be smart to find and understand that it is the same element.

Accordingly, in one embodiment, identifying the one or more existing automated activities in the test automation repository that correlate with the one or more of the plurality of activities associated with the business flow may include finding, by the testing system, elements in the test automation repository that appear on a user interface displaying information associated with the one or more of the plurality of activities associated with the business flow. The elements may be identified by one or more locators. Further, the testing system may identify one or more locators that refer to the same element utilizing the smart match algorithm.

As shown further in FIG. 1, an automated test for the business flow is generated by the testing system utilizing the one or more existing automated activities in the test automation repository. See operation 108. The automated test for the business flow is capable of utilizing a plurality of automatically selected parameters for testing the business flow. In one embodiment, the testing system may automatically save the generated automated test.

A major challenge in automating testing business flow comes from the need to reuse automation code. A business flow to be tested is first reviewed end to end, it is further broken to segments, where each has its own automation activity developed or reused from a repository.

The method 100 increases the reuse of automation activities by automatically mapping a business flow to activities that exist in the automation repository. The method 100 utilizes the existing repository to best cover the business flow to be tested. The method 100 also parses the business flow to activities, some from repository and others may be developed. These joint capabilities increase reusability within a testing project, and across testing projects of similar systems. The reuse of automated activities reduces the automation effort.

It should be noted that the method 100 may be implemented utilizing various systems, hardware (e.g. processors, etc.), software, applications, user interfaces, etc., as dictated by the implementer. For example, the testing system may include one or more processors, databases, repositories, etc. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Companies strive to promote their systems user interface (UI) testing through automation so that a script written once can be used multiple times. Each testing project requires automation for re-runs of the same flows, such as regression testing and agile testing. Automation is even further utilized in projects where the business flow is broken into activities, and automated activities are re-used on different tested business flows. For example, the automation script for log-in to a tested system can be reused on all automated business flows with that tested system.

According to the characteristics of the project, the testing automation team decides which business flows to automate, and determines where to reuse automated activities from one flow to another. The coverage and resulting quality of testing projects can increase with the more business flows that are automated. However, building automation scripts requires much effort by automation developers/experts and depends on the relative stability of the testing environment. The dependency of the testing projects on automation is growing, especially with the increase of agile projects. Each company invests in test automation on its IT projects.

Figures 2A, 2B, 2C:
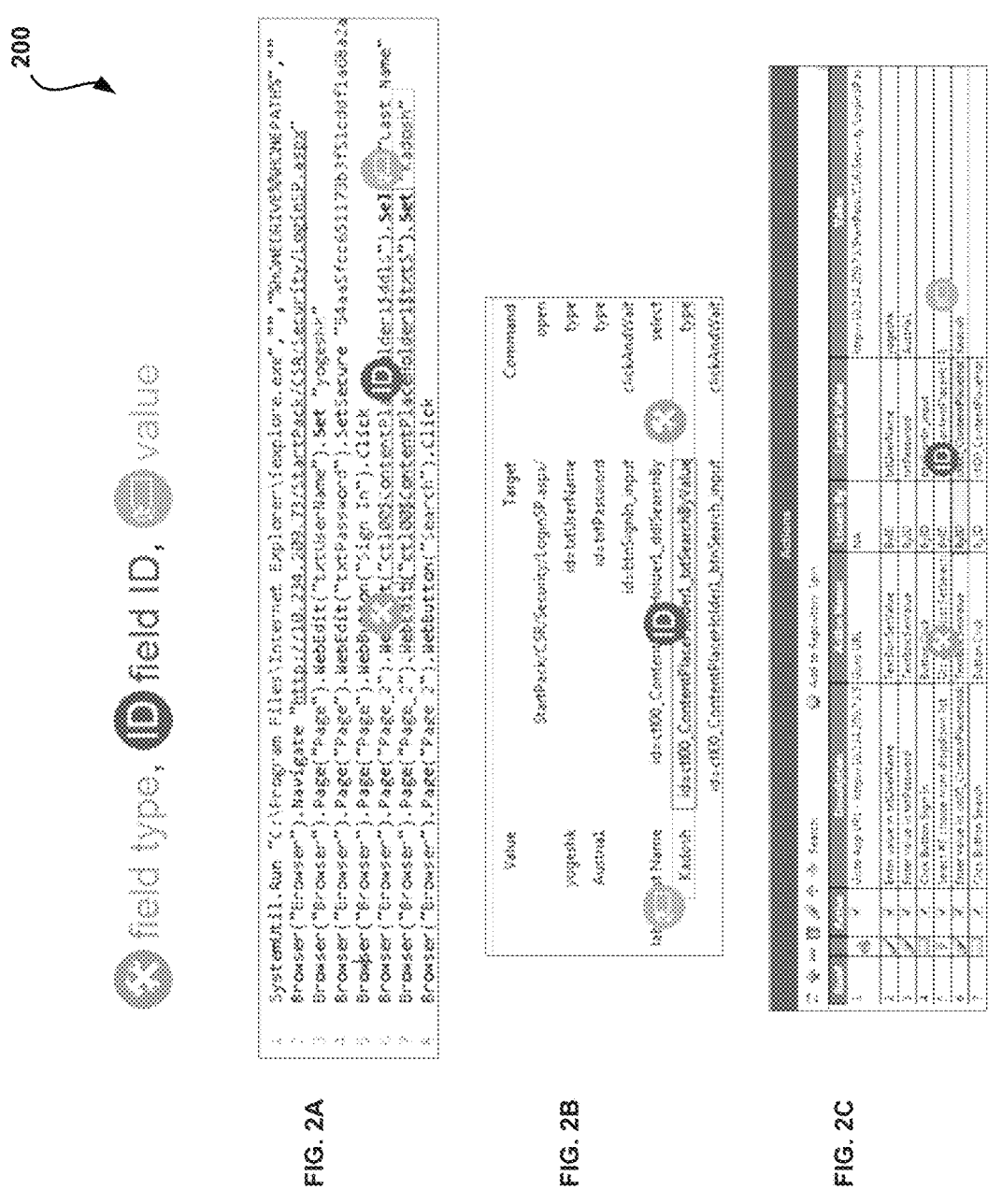

To create automation of a front-end system usage business flow there are two common methods used to date: (1) using recording tools, which have record and play options, to record any action performed on the screen; and (2) writing scripts in some scripting language. Recording tools generally create a script, which is a set of actions that were performed during recording. FIGS. 2A and 2B show examples of such created scripts.

Each recorded action includes a field ID, a field type, and value inserted to the field. Automation experts' scripts also includes actions with a field ID, but the script values are replaced with changeable variables/arguments and validations are added.

Automation experts write the script in activities, which are functions of a set of actions that makes a building block that can be reused in testing several business flows. Thus, a script written generally includes more content and is more flexible than a recorded script, but the written script requires expert work.

The techniques and systems described herein stretch the capabilities of a test recording tool to produce results that are similar to a script written by expert. FIG. 2C shows an example of script that is produced upon recording a business flow, in accordance with one embodiment. The tester records a business flow over the system, and an engine (e.g. computer code for parsing, etc.) implemented by the testing system will automatically parse the business flows into activities and will map the parsed activities to activities existing in a test automation repository.

The step of finding activities that are already developed within the automation activity repository is automated. As a result, the techniques and systems described herein solve a real problem experienced by companies that believe that quality is part of the value they deliver to their users.

Figure 3:
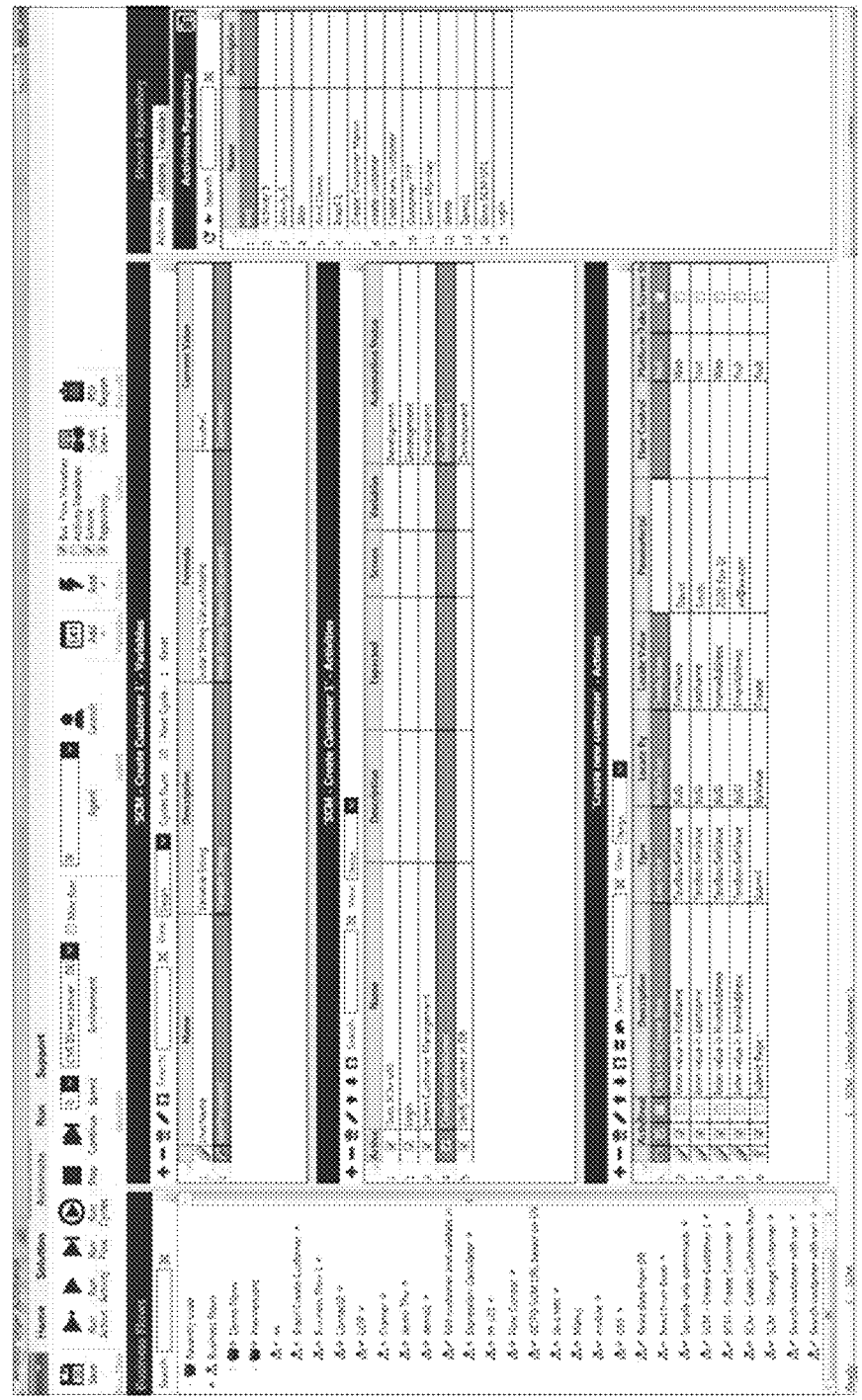
FIG. 3 illustrates a user interface for business flow automation, in accordance with one embodiment.

FIG. 3 illustrates a user interface 300 for business flow automation, in accordance with one embodiment. As an option, the user interface 300 may be implemented in the context of the details of the previous figures. Of course, however, the user interface 300 may be implemented in the context of any desired environment. Further, the aforementioned definitions may equally apply to the description below.

Figure 4:
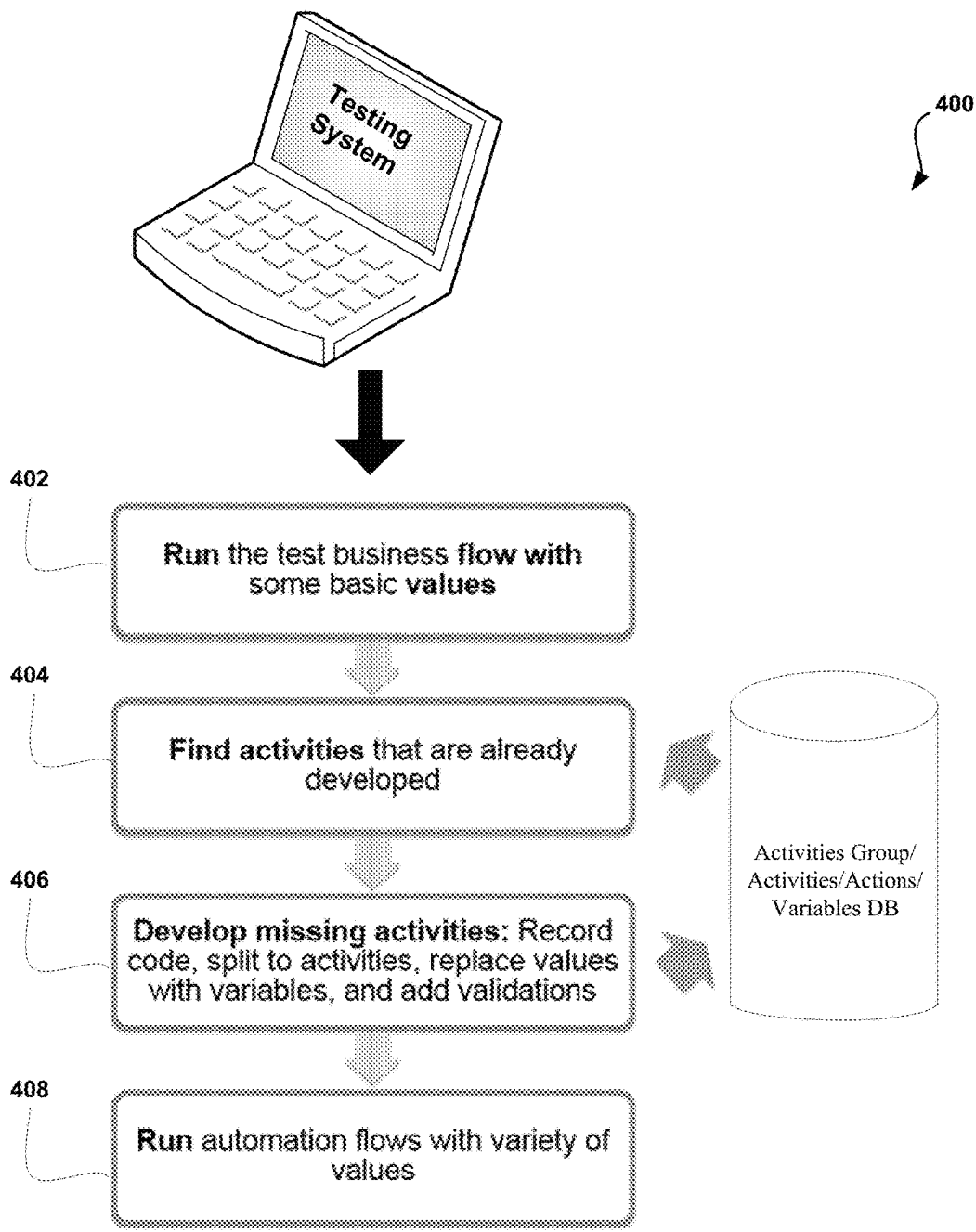
FIG. 4 illustrates a flow diagram for business flow test automation utilizing an automation repository, in accordance with one embodiment.

FIG. 4 illustrates a flow diagram 400 for business flow test automation utilizing an automation repository, in accordance with one embodiment. As an option, the diagram 400 may be implemented in the context of the details of the previous figures. Of course, however, the diagram 400 may be implemented in the context of any desired environment. Further, the aforementioned definitions may equally apply to the description below.

The flow diagram 400 may be implemented by a testing system including various hardware (e.g. servers, processors, databases, repositories, memory, etc.) and software. In operation, the system may allow the user to define and record a new business flow (see operation 402). The business flow is executed with basic values, either automatically selected by the testing system or selected by a user. As a result of recording a business flow, a recorded script is produced (see an example of a recorded script in FIG. 2C).

In addition to direct recording, the testing system may allow the user to perform some basic editing before and after the smart match is performed, such as deleting an action, adding a description, or changing a value, etc.

After there is a recorded business flow, the system automatically finds activities in the repository (see operation 404). The user of the system may also find activities in the repository using a search mechanism and run the automated mapping on remaining code.

The system offers the user several options for parsing the recorded business flow.

Figure 5:
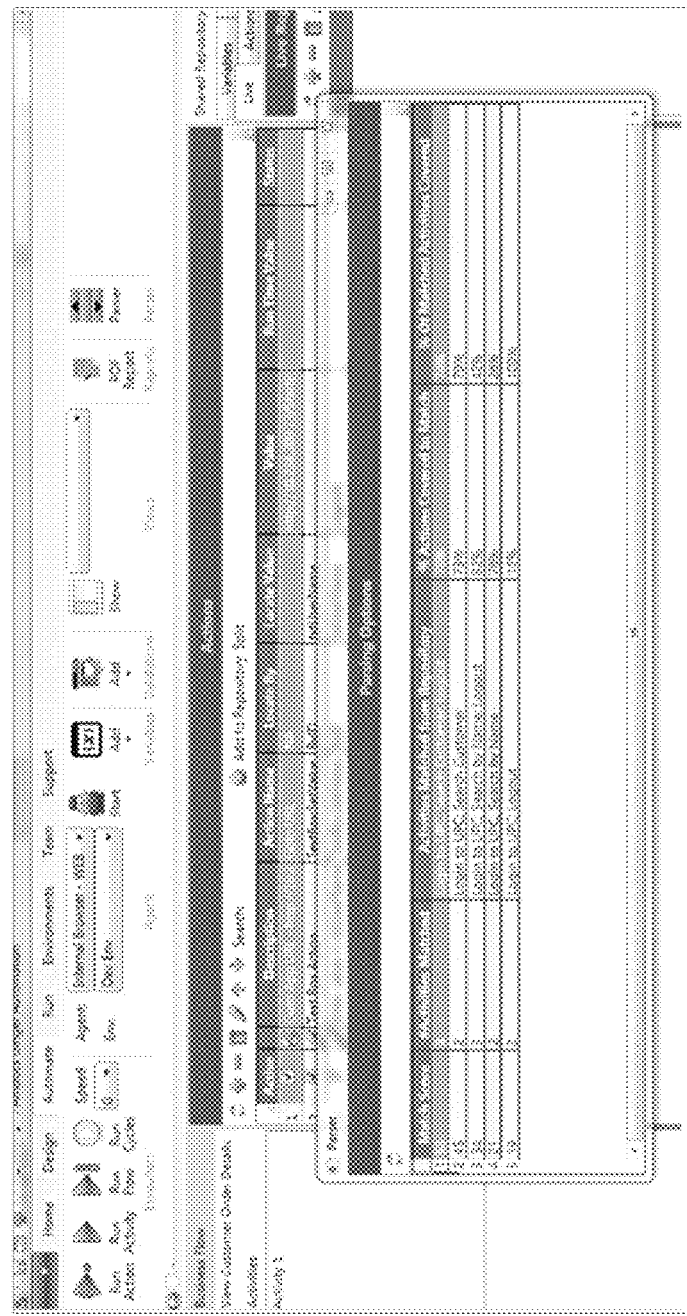
FIG. 5 illustrates a user interface including a parser window for automatic finding options to map recorded business flows, in accordance with one embodiment.

FIG. 5 illustrates a user interface 500 including a parser window for automatic finding options to map recorded business flows, in accordance with one embodiment. As an option, the user interface 500 may be implemented in the context of the details of the previous figures. Of course, however, the user interface 500 may be implemented in the context of any desired environment. Further, the aforementioned definitions may equally apply to the description below.

Each parsing option is a series of activities from the activity repository that covers the recorded actions. For each parsing option, the user gets several indications of the quality of the match between the series of activities and the recorded actions. This may include, for example: (a) the percent of the recorded actions that are covered by the activities series; (b) the percent of actions included in the activities series, which are on the recording; (c) overlaps between activities in the series; (d) the number of validations performed in the activities series; (e) the percent of fields that have a variable versus a pre-defined value; and/or (f) popularity, such as the number of users that selected each of the recommended activities in their recording map.

To simplify the parsing selection, the parsing options may be sorted by a weighted score based on these measurements. The testing system may provide a recommendation or make an auto selection in order to simplify the process for the user. Locators of elements by ID/name may be better than CSS or other techniques. Xpath can access the same object using different syntax, so rules may be defined in advance that will give positive/negative points based on criteria. More points equals better recommendations.

Thus, the system allows the user to select a parsing option from several options. The user is also given the opportunity to develop missing activities to be added later in the repository (see operation 406 of FIG. 4).

After the user selects a parsing option, the parsing is applied to the recorded actions.

Figure 6:
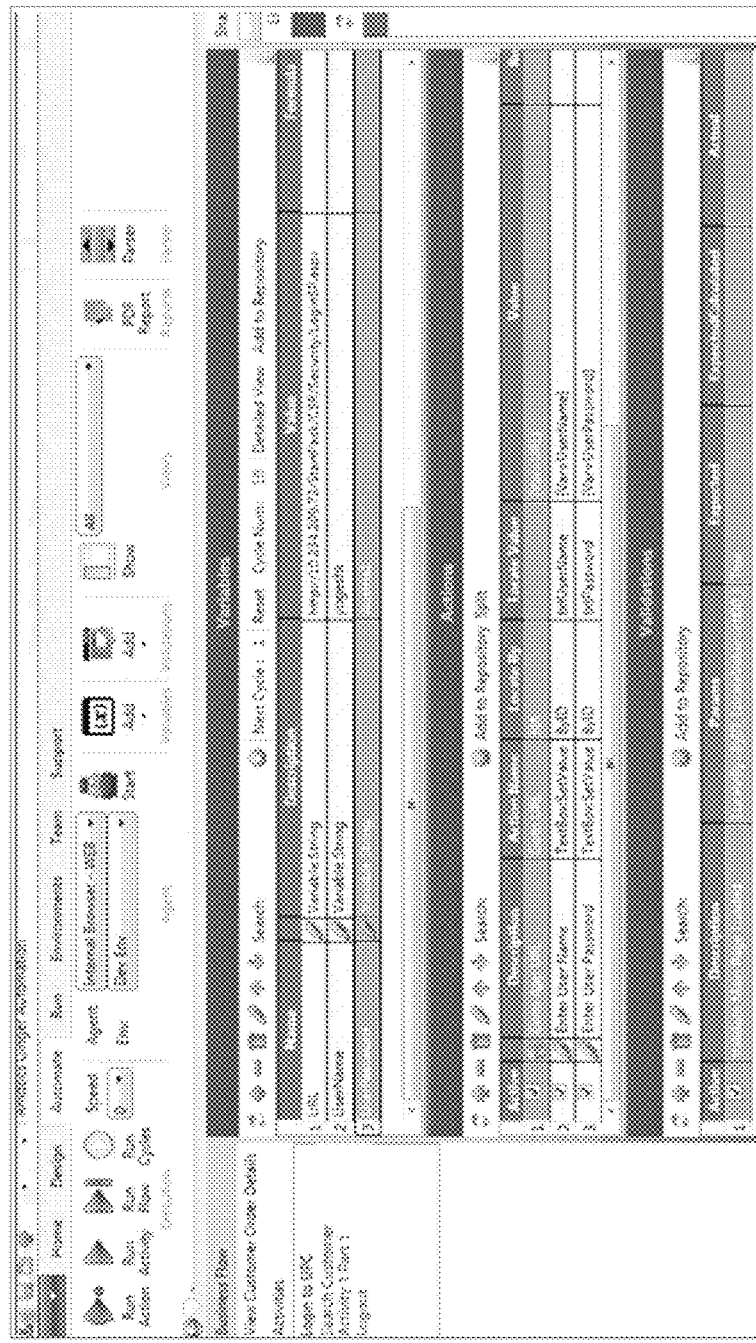
FIG. 6 illustrates a user interface showing parsing options as applied to recorded actions, in accordance with one embodiment.

FIG. 6 illustrates a user interface 600 showing parsing options as applied to recorded actions, in accordance with one embodiment. As an option, the user interface 600 may be implemented in the context of the details of the previous figures. Of course, however, the user interface 600 may be implemented in the context of any desired environment. Further, the aforementioned definitions may equally apply to the description below.

The business flow after parsing includes all the recommended activities from the activity repository in sequence (e.g. shown in area 602 of FIG. 6). Sequences of consecutive code that were recorded and fall in between the mapped activities are grouped under a new activity name. For example, there may be two activities from the library, followed by an unmapped series of consecutive actions that are labeled as "Activity 1", then another activity from the library, and another sequence of unmapped actions labeled as "Activity 2", etc.

The user can elaborate on (e.g. add to, etc.) the automation script for Activity 1 and Activity 2, and save it as new named activities in the repository, for the benefit of future flows.

Moreover, the completed automated business flow may be executed with various values for testing (e.g. see operation 408 of FIG. 4).

Thus, the system allows for automatic parsing of a plain recorded UI test to activities in the automation repository, which is unique.

Figure 7:
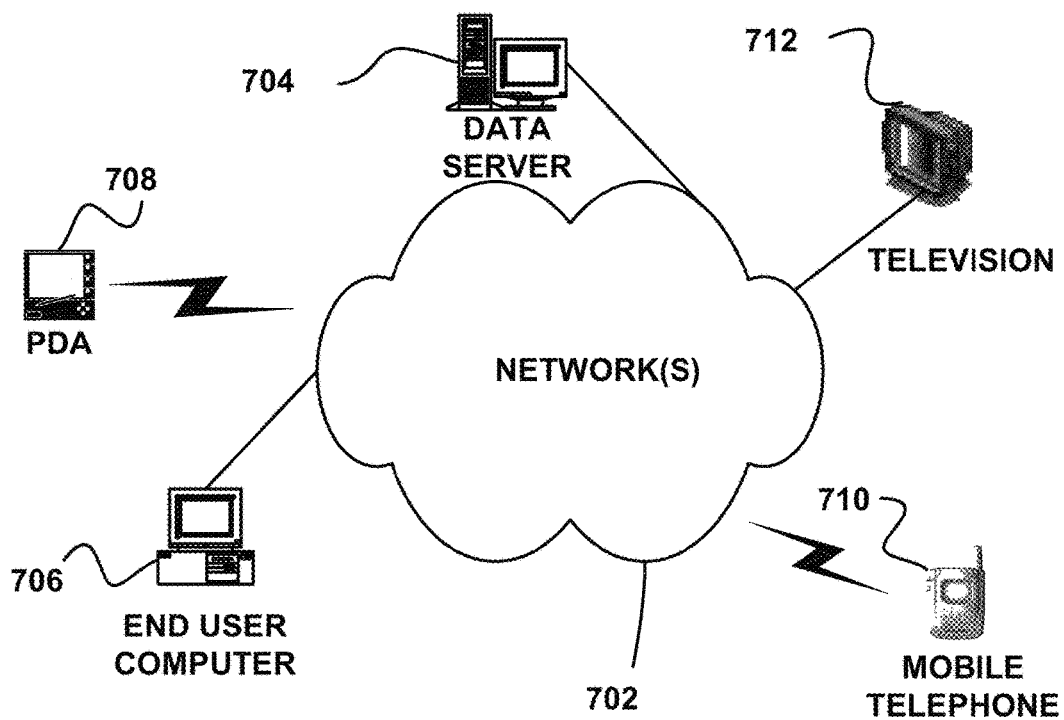
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
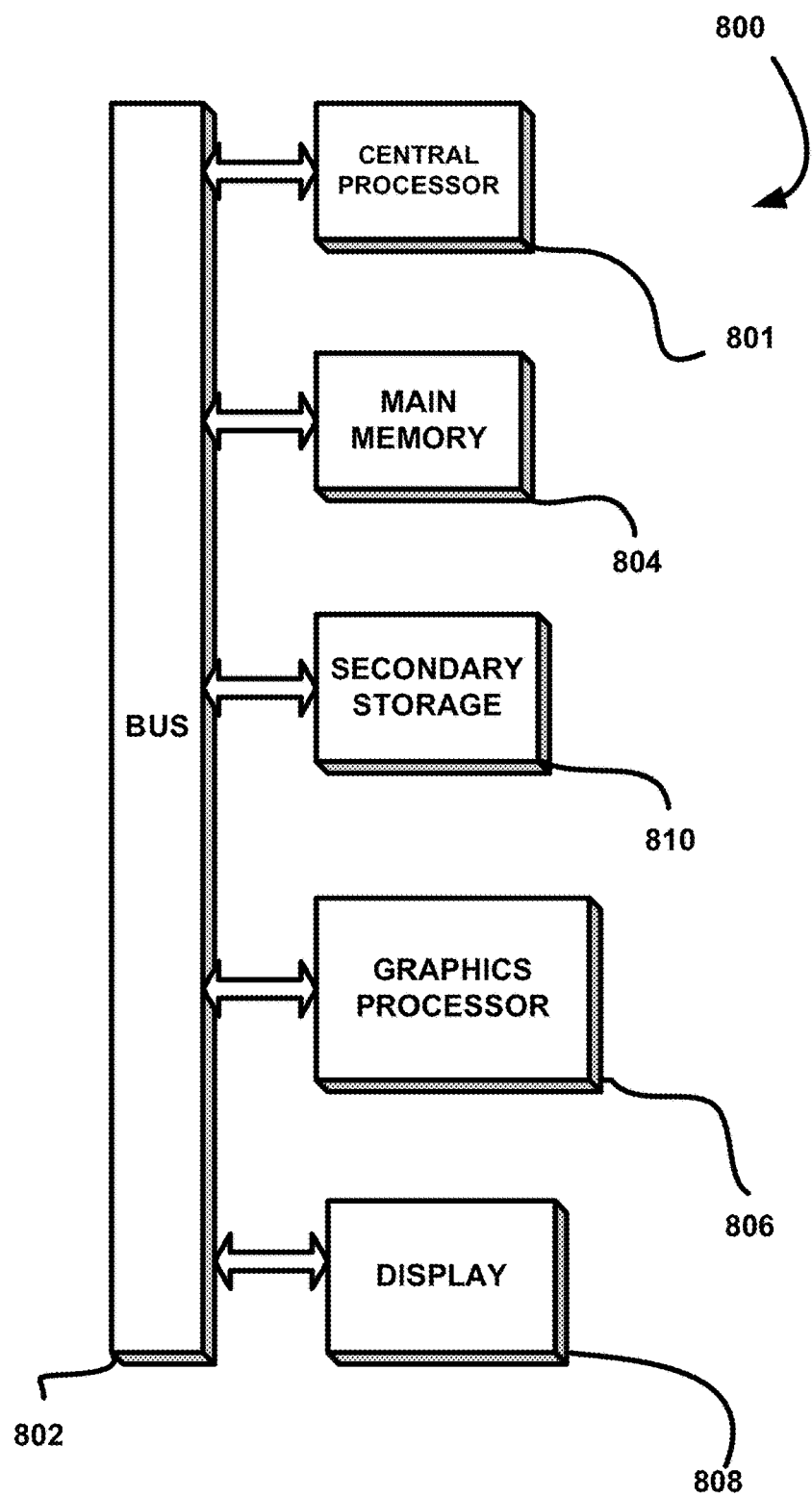
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
    recording, by a testing system, a business flow executed by a user, the business flow being executed utilizing a plurality of user selected parameters;
    presenting, by the testing system, a plurality of parsing options to utilize for parsing the recorded business flow into a plurality of activities included in the business flow, wherein each parsing option is a series of activities that covers the plurality of activities included in the business flow;
    presenting, by the testing system, an indication of a quality of match between the series of activities associated with each parsing option and the plurality of activities included in the business flow;
    receiving, by the testing system, a selection of at least one of the plurality of parsing options to utilize for parsing the recorded business flow into the plurality of activities;
    automatically parsing, by the testing system, the recorded business flow into the plurality of activities included in the business flow, based on the received selection of the at least one of the plurality of parsing options;
    automatically mapping, by the testing system, one or more of the plurality of activities included in the business flow to one or more automated activities existing in a test automation repository, each of the automated activities existing in the test automation repository being automation code for automating a corresponding activity; and
    generating, by the testing system, an automated test for the business flow utilizing the one or more automated activities existing in the test automation repository, the automated test for the business flow being capable of utilizing a plurality of automatically selected parameters for testing the business flow.

2. The method of claim 1, wherein the testing system displays results of the parsed recorded business flow utilizing a user interface.

3. The method of claim 2, wherein the results of the parsed recorded business flow include indications associated with a quality of a match between the recorded business flow and the plurality of activities included in the business flow.

4. The method of claim 1, wherein the testing system automatically saves the generated automated test.

5. The method of claim 1, wherein automatically mapping, by the testing system, one or more of the plurality of activities included in the business flow to one or more automated activities existing in a test automation repository includes:
  finding, by the testing system, automated activities in the test automation repository associated with elements that appear on a user interface displaying information associated with the one or more of the plurality of activities included in the business flow.

6. The method of claim 1, further comprising:
  executing the one or more automated activities included in the automated test with the plurality of automatically selected parameters for testing the business flow.

7. A computer program product embodied on a non-transitory computer readable medium, comprising computer code for:
  recording, by a testing system, a business flow executed by a user, the business flow being executed utilizing a plurality of user selected parameters;
  presenting, by the testing system, a plurality of parsing options to utilize for parsing the recorded business flow into a plurality of activities included in the business flow, wherein each parsing option is a series of activities that covers the plurality of activities included in the business flow;
  presenting, by the testing system, an indication of a quality of match between the series of activities associated with each parsing option and the plurality of activities included in the business flow;
  receiving, by the testing system, a selection of at least one of the plurality of parsing options to utilize for parsing the recorded business flow into the plurality of activities;
  automatically parsing, by the testing system, the recorded business flow into the plurality of activities included in the business flow, based on the received selection of the at least one of the plurality of parsing options;
  automatically mapping, by the testing system, one or more of the plurality of activities included in the business flow to one or more automated activities existing in a test automation repository, each of the automated activities existing in the test automation repository being automation code for automating a corresponding activity; and
  generating, by the testing system, an automated test for the business flow utilizing the one or more automated activities existing in the test automation repository, the automated test for the business flow being capable of utilizing a plurality of automatically selected parameters for testing the business flow.

8. The computer program product of claim 7, wherein the testing system displays results of the parsed recorded business flow utilizing a user interface.

9. The computer program product of claim 8, wherein the results of the parsed recorded business flow include indications associated with a quality of a match between the recorded business flow and the plurality of activities included in the business flow.

10. The computer program product of claim 7, wherein the testing system automatically saves the generated automated test.

11. A testing system, comprising:
  one or more hardware processors configured for:
  recording, by the testing system, a business flow executed by a user, the business flow being executed utilizing a plurality of user selected parameters;
  presenting, by the testing system, a plurality of parsing options to utilize for parsing the recorded business flow into a plurality of activities included in the business flow, wherein each parsing option is a series of activities that covers the plurality of activities included in the business flow;
  presenting, by the testing system, an indication of a quality of match between the series of activities associated with each parsing option and the plurality of activities included in the business flow;
  receiving, by the testing system, a selection of at least one of the plurality of parsing options to utilize for parsing the recorded business flow into the plurality of activities;
  automatically parsing, by the testing system, the recorded business flow into the plurality of activities included in the business flow, based on the received selection of the at least one of the plurality of parsing options;
  automatically mapping, by the testing system, one or more of the plurality of activities included in the business flow to one or more automated activities existing in a test automation repository, each of the automated activities existing in the test automation repository being automation code for automating a corresponding activity; and
  generating, by the testing system, an automated test for the business flow utilizing the one or more automated activities existing in the test automation repository, the automated test for the business flow being capable of utilizing a plurality of automatically selected parameters for testing the business flow.

12. The testing system of claim 11, wherein the testing system displays results of the parsed recorded business flow utilizing a user interface.

13. The testing system of claim 12, wherein the results of the parsed recorded business flow include indications associated with a quality of a match between the recorded business flow and the plurality of activities included in the business flow.

* * * * *